United States Patent
Chou et al.

(10) Patent No.: US 10,678,342 B2
(45) Date of Patent: Jun. 9, 2020

(54) METHOD OF VIRTUAL USER INTERFACE INTERACTION BASED ON GESTURE RECOGNITION AND RELATED DEVICE

(71) Applicant: XRSpace CO., LTD., Taoyuan (TW)

(72) Inventors: Peter Chou, Taipei (TW); Feng-Seng Chu, New Taipei (TW); Yen-Hung Lin, Taoyuan (TW); Shih-Hao Ke, New Taipei (TW); Jui-Chieh Chen, Taipei (TW)

(73) Assignee: XRSpace CO., LTD., Taoyuan (TW)

( * ) Notice: Subject to any disclaimer, the term of this patent is extended or adjusted under 35 U.S.C. 154(b) by 0 days.

(21) Appl. No.: 16/166,130

(22) Filed: Oct. 21, 2018

(65) Prior Publication Data

US 2020/0125176 A1    Apr. 23, 2020

(51) Int. Cl.
*G06F 3/01* (2006.01)
*G06F 3/0481* (2013.01)
*G06K 9/00* (2006.01)

(52) U.S. Cl.
CPC ............ *G06F 3/017* (2013.01); *G06F 3/0481* (2013.01); *G06K 9/00355* (2013.01)

(58) Field of Classification Search
CPC ..... G06F 3/017; G06F 3/0481; G06F 9/00355
See application file for complete search history.

(56) References Cited

U.S. PATENT DOCUMENTS

| | | |
|---|---|---|
| 6,771,294 B1 | 8/2004 | Pulli |
| 2012/0225719 A1* | 9/2012 | Nowozin ................ G06F 3/017 463/36 |
| 2014/0006997 A1* | 1/2014 | Kim ...................... G06F 3/0488 715/773 |
| 2014/0204013 A1 | 7/2014 | O'Prey |
| 2014/0240231 A1 | 8/2014 | Minnen |
| 2014/0266988 A1 | 9/2014 | Fisher |

(Continued)

FOREIGN PATENT DOCUMENTS

| | | |
|---|---|---|
| CN | 101387908 B | 10/2010 |
| JP | 2016-5157 A | 1/2016 |

(Continued)

OTHER PUBLICATIONS

Office Action dated Mar. 3, 2020 for the Japanese Application No. 2018-226573, filed Dec. 3, 2018, pp. 1-4.

*Primary Examiner* — Shourjo Dasgupta
(74) *Attorney, Agent, or Firm* — Winston Hsu

(57) ABSTRACT

A method of virtual user interface interaction based on gesture recognition comprises detecting two hands in a plurality of images, recognizing each hand's gesture, projecting a virtual user interface on an open gesture hand when one hand is recognized with a point gesture and the other hand is recognized with an open gesture, tracking an index fingertip of the point gesture hand, determining whether the index fingertip of the point gesture hand is close to the open gesture hand within a predefined rule, interpreting a movement of the index fingertip of the point gesture hand as a click command when the index fingertip of the point gesture hand is close to the open gesture hand within the predefined rule, and in response to the click command, generating image data with a character object of the virtual user interface object.

14 Claims, 4 Drawing Sheets

(56) References Cited

U.S. PATENT DOCUMENTS

| | | | |
|---|---|---|---|
| 2015/0089453 A1* | 3/2015 | Dal Mutto | G06F 3/017 |
| | | | 715/852 |
| 2015/0235447 A1 | 8/2015 | Abovitz | |
| 2015/0309629 A1 | 10/2015 | Amariutei | |
| 2016/0306422 A1 | 10/2016 | Parham | |
| 2017/0123487 A1 | 5/2017 | Hazra | |
| 2018/0329506 A1* | 11/2018 | Liang | G06F 3/017 |

FOREIGN PATENT DOCUMENTS

| | | |
|---|---|---|
| JP | 2016-504652 A | 2/2016 |
| JP | 2017-91186 A | 5/2017 |
| WO | 2018/079446 A1 | 5/2018 |

\* cited by examiner

METHOD OF VIRTUAL USER INTERFACE INTERACTION BASED ON GESTURE RECOGNITION AND RELATED DEVICE

BACKGROUND OF THE INVENTION

1. Field of the Invention

The invention relates to a method and apparatus of user interface display, and more particularly, to a method and apparatus of virtual user interface interaction based on gesture recognition.

2. Description of the Prior Art

Most virtual reality (VR) system can track user's movement from human interface devices carried by a user. The human interface device (e.g. joystick, controller, touchpad, etc.) is used for the user to interact with a software system, for example, a VR game, executed by a computing device. In addition, a head-mounted display (HMD) worn by the user is used for displaying the interacting images generated by the computing device to the user for VR experience.

In order to increase user's willingness of VR immersion, virtual user interface are proposed for creating a new user experiences. However, there is no specification for virtual keyboard interaction with gesture recognition. Thus, conventional humanized user interfaces are still implemented with remote or joystick.

SUMMARY OF THE INVENTION

It is therefore an objective of the present invention to provide a method and apparatus of virtual user interface interaction based on gesture recognition for an interaction system.

The present invention discloses a method of virtual user interface interaction based on gesture recognition for an interaction system. The method comprises detecting two hands in a plurality images, recognizing each hand's gesture when the two hands are detected, projecting a virtual user interface object on an open gesture hand when one hand is recognized with a point gesture and the other hand is recognized with an open gesture, tracking an index fingertip of the point gesture hand, for obtain a relative position of the index fingertip of the point gesture hand and the open gesture hand, determining whether the index fingertip of the point gesture hand is close to the open gesture hand within a predefined rule, interpreting a movement of the index fingertip of the point gesture hand as a click command when the index fingertip of the point gesture hand is close to the open gesture hand within the predefined rule, and in response to the click command, generating image data with a character object of the virtual user interface object base on the relative position.

The present invention discloses an electronic device of an interaction system for virtual user interface interaction based on gesture recognition. The electronic device comprises a processing device for executing a program, and a memory device coupled to the processing device for storing the program; wherein the program instructs the processing device to perform the following steps: detecting two hands in a plurality of images, recognizing each hand's gesture when the two hands are detected, projecting a virtual user interface on an open gesture hand when one hand is recognized with a point gesture and the other hand is recognized with an open gesture, tracking an index fingertip of the point gesture hand, for obtain a relative position of the index fingertip of the point gesture hand and the open gesture hand, determining whether the index fingertip of the point gesture hand is close to the open gesture hand within a predefined rule, interpreting a movement of the index fingertip of the point gesture hand as a click command when the index fingertip of the point gesture hand is close to the open gesture hand within the predefined rule, and in response to the click command, generating image data with a character object of the virtual user interface object based on the relative position.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
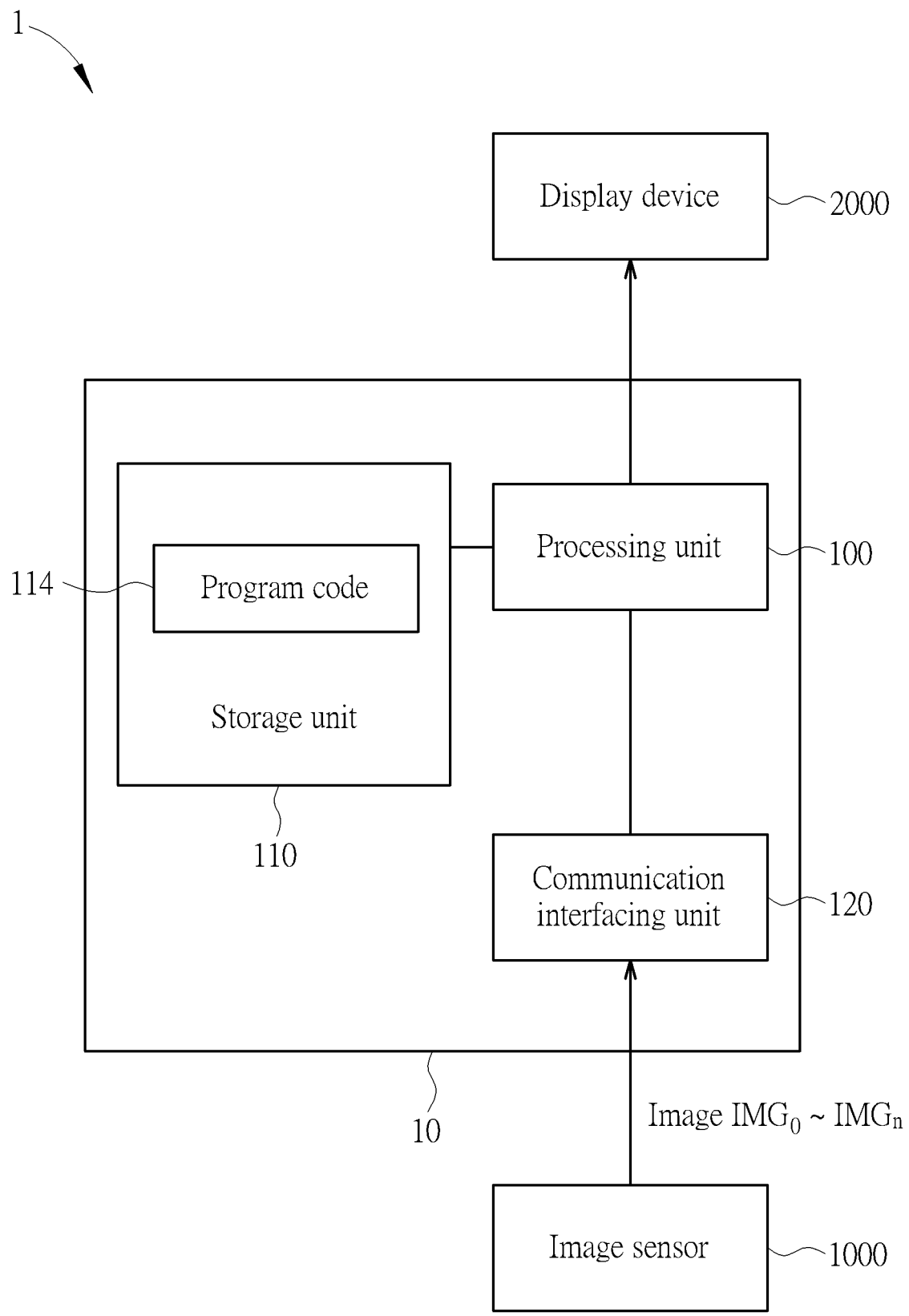
FIG. 1 is a schematic diagram of an interaction system according to an embodiment of the present disclosure.

FIG. 1 is a schematic diagram of an interaction system 1 according to one embodiment of the present disclosure. The interaction system 1 includes an electronic device 10, an image sensor 1000 and a display device 2000. The electronic device 10 includes a processing unit 100, such as a microprocessor or Application Specific Integrated Circuit (ASIC), a storage unit 110 and a communication interfacing unit 120. The storage unit 110 may be any data storage device that can store a program code 114, for access by the processing unit 100. Examples of the storage unit 110 include but are not limited to a subscriber identity module (SIM), read-only memory (ROM), flash memory, random-access memory (RAM), CD-ROMs, magnetic tape, hard disk, and optical data storage device. The communication interfacing unit 120 is applied with a wire or wireless communication for exchange signals with other devices (e.g. image sensor 1000) of the interaction system 1.

Figure 2:
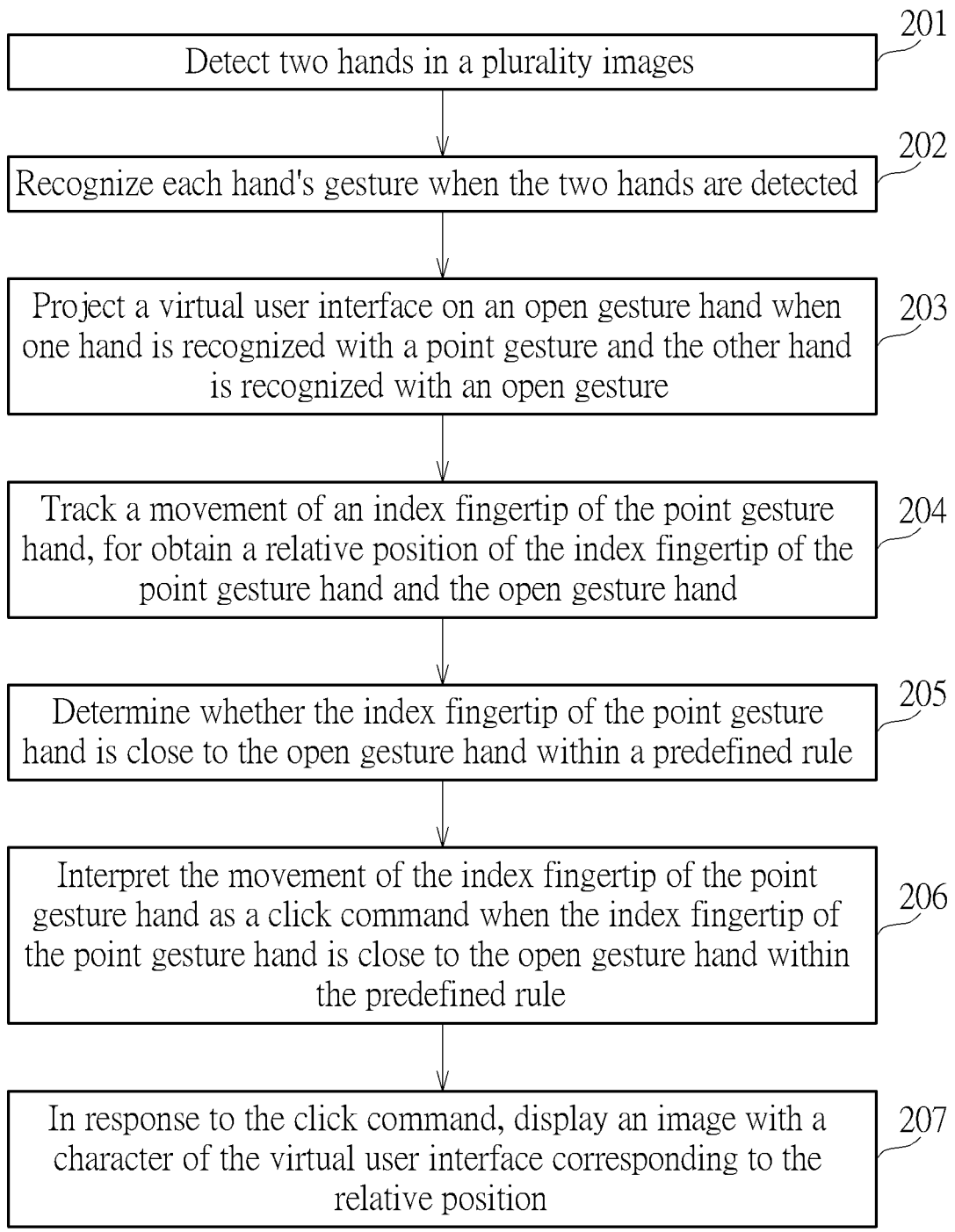
FIG. 2 is a flowchart of an interaction process according to an embodiment of the present disclosure

Reference is made to FIG. 2. A flowchart of an interaction process 20 according to an embodiment of the present disclosure is illustrated. The interaction process 20 could be utilized in the electronic device 10 of FIG. 1. The interaction process 20 may be compiled into a program code 114 to be stored in the storage unit 110, and may include the following steps:

Step 201: Detect two hands in a plurality of images.

Step 202: Recognize each hand's gesture when the two hands are detected.

Step 203: Project a virtual user interface object on an open gesture hand when one hand is recognized with a point gesture and the other hand is recognized with an open gesture.

Step 203: Track an index fingertip of the point gesture hand, for obtaining a relative position of the index fingertip of the point gesture hand and the open gesture hand.

Step 205: Determine whether the index fingertip of the point gesture hand is close to the open gesture hand within a predefined rule.

Step 206: Interpret a movement of the index fingertip of the point gesture hand as a click command when the index fingertip of the point gesture hand is close to the open gesture hand within the predefined rule.

Step 207: In response to the click command, generate an image data with a character object of the virtual user interface object based on the relative position.

Figure 3:
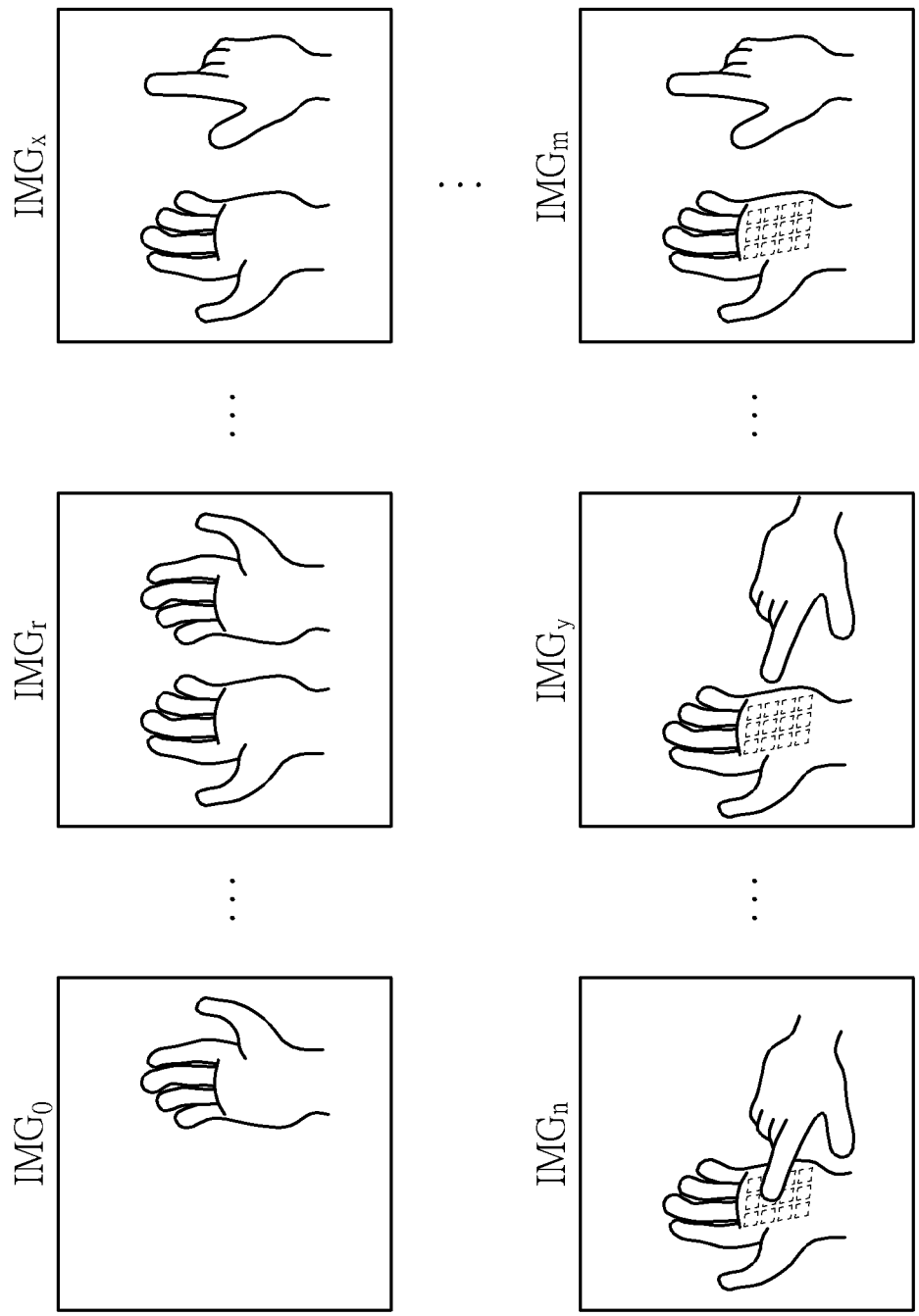
FIG. 3 is a schematic diagram of images with hand gesture detection according to an embodiment of the present disclosure.

According to the interaction process 20, the electronic device 10 detects two hands in the images $IMG_0$-$IMG_n$ as shown in FIG. 3, and then determines hand gestures in the images $IMG_0$-$IMG_n$. In an embodiment, the plurality of images $IMG_0$-$IMG_n$ is generated by the image sensor 1000, which may be a structured light (SL) camera or a time of flight (ToF) camera, and is received by the communication interfacing unit 220 for the processing unit 200 to process, so as to generate a processing result to the display device 2000 for interaction.

In detail, the hand detection is realized by the following steps:

1. Extract depth pixels of the images $IMG_0$-$IMG_n$ with a working distance;
2. Use Random Decision Forest (RDF) to classify all above pixels into possible left hand group and right hand group;
3. Take a set of depth context surrounding the examined pixel as input reference with RDF, and output the possible group of the examined pixel;
4. Match left/right hand groups into connected objects in a frame;
5. Calculate left/right hand contour radius;
6. Crop left/right hand silhouette; and
7. Extract left/right hand depth information according to the left/right hand silhouette.

If no hand or only one hand is detected, as shown in the image $IMG_0$ of FIG. 3, the electronic device 10 should keep perform hand detection until two hands are detected. On the other hand, if two hands are both detected, as shown in the image $IMG_r$ of FIG. 3, the electronic device 10 performs gesture recognition by the following steps:

1. Extract hand subframes;
2. Use RDF to classify subframe pixels into gesture groups; and
3. Set the majority group as gesture result, and use the secondary group as gesture reference.

Note that, the gesture recognition may be performed by machine learning, which is trained by data sets of images. Those skilled in the art should be well known, so it is omitted herein. Moreover, after the gestures of the two hands are recognized, the electronic device 10 should determine whether one hand (e.g. right hand) is in a point gesture and the other hand (e.g. left hand) is in an open gesture. If the point gesture hand and open gesture hand are detected, as shown in the image $IMG_x$ of FIG. 3, the electronic device 10 further determines whether the open gesture hand is within a predefined angle (e.g. palm facing inside, straight up) and/or the open gesture hand is on a side of the point gesture hand. If the open gesture hand is conformed to some predetermined rules defined in storage unit 110 of the electronic device 10, the electronic device 10 considers the open gesture hand as an unmovable object. For the predetermined rules, those skilled in the art may make modifications and alterations accordingly, which is not limited.

Figure 4:
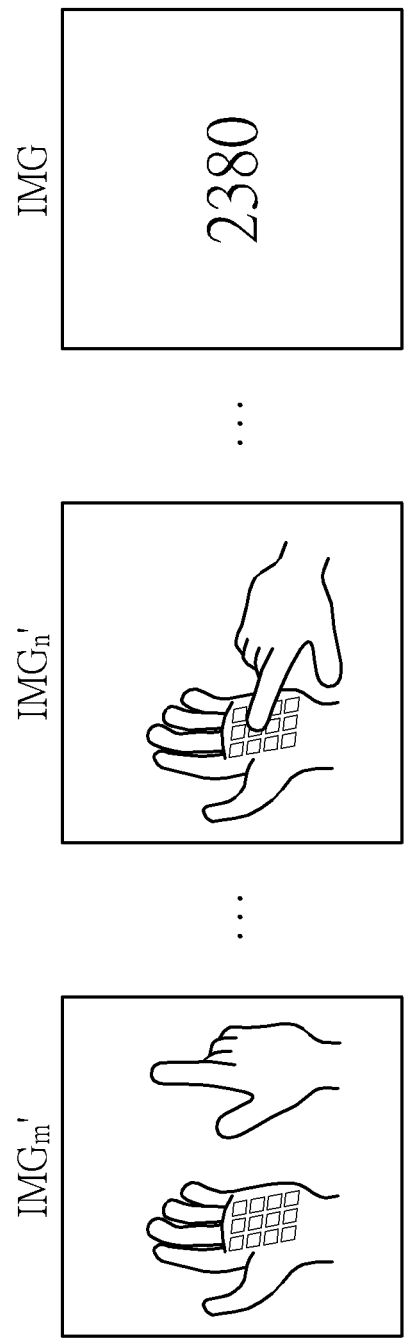
FIG. 4 is a schematic diagram of interaction display images according to an embodiment of the present disclosure.

As considering the open gesture hand as an unmovable object, the electronic device 10 generates image data with a virtual user interface (UI) object projected at the location of the open gesture hand, which is displayed by the display device 2000 for the user, as shown in the images $IMG_m'$ and $IMG_n'$ of FIG. 4. In an embodiment, the virtual UI object may be a virtual keyboard or a virtual number pad. Meanwhile, the electronic device 10 tracks a movement of the index fingertip of the point gesture hand, as shown in the image $IMG_y$ of FIG. 3, to obtain a relative position of the index fingertip of the point gesture hand and the open gesture hand. With such manner, the electronic device 10 can determine whether the index fingertip of the point gesture hand is close to the open gesture hand within a predefined rule (e.g. a predefined distance). If the index fingertip of the point gesture hand is close to the open gesture hand within a predefined distance, as shown in the image $IMG_n$ of FIG. 3, the electronic device 10 interpret the movement of the index fingertip of the point gesture hand as a "click" command. Thus, the electronic device 10 generates image data with a character object of the virtual UI object based on the relative position, and transmit the image data to the display device 2000 for displaying the character object to the user.

Note that, if the electronic device 10 detects that the open gesture hand moves, the virtual UI object projection is cancelled. That is, the electronic device 10 generates image data without the virtual UI object based on the image received from the image sensor 1000, for the display device 2000 to display.

FIG. 4 illustrates interaction display images according to an embodiment of the present invention. The image $IMG_M$ displayed by the display device 2000 shows that the virtual UI object is projected on the open gesture hand, which is generated by the processing unit 100 of the electronic device 10 based on the recognized gestures. That is, as abovementioned, after the electronic device 10 determines one hand with point gesture and the other hand with open gesture, the electronic device 10 generates image data with virtual UI object and transmit the image data to the display device 13 to display the image $IMG_m'$ to the user. The image $IMG_n'$ shows that the click movement of the point gesture hand. The image IMG shows the character objects (e.g. numbers "2", "3", "8". "0") which are clicked by the point gesture hand. Therefore, the user may interact with the virtual UI object without physical contact to any user input devices.

The abovementioned steps of the processes including suggested steps can be realized by means that could be a hardware, a firmware known as a combination of a hardware device and computer instructions and data that reside as read-only software on the hardware device or an electronic system. Examples of hardware can include analog, digital and mixed circuits known as microcircuit, microchip, or silicon chip. Examples of the electronic system can include a system on chip (SOC), system in package (SiP), a computer on module (COM) and the electronic device 10.

To sum up, the present invention proposes an interaction process for the user to interact with the interaction system via the virtual UI object projection, which is realized by the gesture recognition and gesture movement detection.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of virtual user interface interaction based on gesture recognition for an interaction system, the method comprising:
   detecting two hands in a plurality of images; the detecting step comprises:
   extracting depth pixels of an image with a user's hand within a working distance;
   classifying the depth pixels into a possible left hand group and a right hand group with Random Decision Forest (RDF);
   taking a set of depth context surrounding an examined pixel as an input reference by the RDF, and outputting the possible group of the examined matching the left or right hand group into connected objects in a frame;
   calculating a left or right hand contour radius;
   cropping a left or right hand silhouette; and
   extracting left or right hand depth information according to the left or right hand silhouette;
   recognizing each hand's gesture when the two hands are detected; the recognizing step including:
   extract hand subframes;
   classifying pixels of the hand subframes into gesture groups with the RDF;
   setting a majority group of the gesture groups as a gesture result; and
   using a secondary group of the gesture groups as a gesture reference;
   projecting a virtual user interface on an open gesture hand when one hand is recognized with a point gesture and the other hand is recognized with an open gesture;
   tracking an index fingertip of the point gesture hand, for obtain a relative position of the index fingertip of the point gesture hand and the open gesture hand;
   determining whether the index fingertip of the point gesture hand is close to the open gesture hand within a predefined rule; and
   interpreting a movement of the index fingertip of the point gesture hand as a click command when the index fingertip of the point gesture hand is close to the open gesture hand within the predefined rule.

2. The method of claim 1, wherein the predefined rule includes a predetermined angle or a predetermined distance.

3. The method of claim 1, further comprising:
   consider the open gesture hand as an unmovable object; and
   canceling the virtual user interface if the open gesture hand moves.

4. The method of claim 1, further comprising:
   determining whether the open gesture hand is within a predefined angle, or the open gesture hand is on a side of the point gesture hand.

5. The method of claim 4, further comprising:
   consider the open gesture hand as an unmovable object when determining the open gesture hand is within the predefined angle, or the open gesture hand is on the side of the point gesture hand;
   wherein the projecting step comprises projecting the virtual user interface at a location corresponding to the unmovable object when one hand is recognized with a point gesture and the other hand is recognized with an open gesture.

6. The method of claim 1, wherein the virtual user interface includes a virtual keyboard or a virtual number pad.

7. The method of claim 1, further comprising:
   in response to the click command, generating image data with a character object of the virtual user interface based on the relative position.

8. An electronic device of an interaction system for virtual user interface interaction based on gesture recognition, the apparatus comprising:
   a processing device for executing a program; and
   a memory device coupled to the processing device for storing the program;
   wherein the program instructs the processing device to perform the following steps:
   detecting two hands in a plurality of images; the detecting step comprises:
   extracting depth pixels of an image with a user's hand within a working distance;
   classifying the depth pixels into a possible left hand group and a right hand group with Random Decision Forest (RDF);
   taking a set of depth context surrounding an examined pixel as an input reference by the RDF, and outputting the possible group of the examined pixel;
   matching the left or right hand group into connected objects in a frame;
   calculating a left or right hand contour radius;
   cropping a left or right hand silhouette; and
   extracting left or right hand depth information according to the left or right hand silhouette;
   recognizing each hand's gesture when the two hands are detected; the recognizing step comprises:
   extract hand subframes;
   classifying pixels of the hand subframes into gesture groups with the RDF;
   setting a majority group of the gesture of groups as a gesture result; and
   using a secondary group of the gesture of groups as a gesture reference;
   projecting a virtual user interface on an open gesture hand when one hand is recognized with a point gesture and the other hand is recognized with an open gesture;
   tracking an index fingertip of the point gesture hand, for obtain a relative position of the index fingertip of the point gesture hand and the open gesture hand;
   determining whether the index fingertip of the point gesture hand is close to the open gesture hand within a predefined rule; and
   interpreting a movement of the index fingertip of the point gesture hand as a click command when the index fingertip of the point gesture hand is close to the open gesture hand within the predefined rule.

9. The apparatus of claim 8, wherein the predefined rule includes a predetermined angle or a predetermined distance.

10. The apparatus of claim 8, wherein the program further instructs the processing means to perform the following steps:
    consider the open gesture hand as an unmovable object; and
    canceling the virtual user interface if the open gesture hand moves.

11. The apparatus of claim 8, wherein the program further instructs the processing means to perform the following steps:
    determining whether the open gesture hand is within a predefined angle, or the open gesture hand is on a side of the point gesture hand.

12. The apparatus of claim 11, wherein the program further instructs the processing means to perform the following steps:
consider the open gesture hand as an unmovable object when determining the open gesture hand is within the predefined angle, or the open gesture hand is on the side of the point gesture hand;
wherein the projecting step comprises projecting the virtual user interface at a location corresponding to the unmovable object when one hand is recognized with a point gesture and the other hand is recognized with an open gesture.

13. The apparatus of claim 8, wherein the virtual user interface includes a virtual keyboard or a virtual number pad.

14. The apparatus of claim 8, wherein the program further instructs the processing means to perform the following step:
in response to the click command, generating image data with a character object of the virtual user interface based on the relative position.

\* \* \* \* \*